United States Patent [19]
Allen et al.

[11] Patent Number: 6,000,003
[45] Date of Patent: *Dec. 7, 1999

[54] COMMUNICATION CIRCUIT HAVING NETWORK CONNECTION DETECTION CAPABILITY

[75] Inventors: Charles M. Allen, Sunnyvale; Brett J. Fox, Mountain View; Sui Ping Shieh, Los Altos; Robert Bruce Denmark, Irvine, all of Calif.

[73] Assignee: Maxim Integrated Products, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/715,927

[22] Filed: Sep. 19, 1996

Related U.S. Application Data

[63] Continuation-in-part of application No. 08/534,954, Sep. 28, 1995, Pat. No. 5,799,194, which is a continuation-in-part of application No. 08/315,130, Sep. 29, 1994, Pat. No. 5,649,210.

[51] Int. Cl.$^6$ .................................................. G06F 1/32
[52] U.S. Cl. ........................................ 710/320; 340/425.2
[58] Field of Search ........................ 395/750.01–750.08; 713/300–340; 326/62–92; 340/425.2

[56] References Cited

U.S. PATENT DOCUMENTS

| | | |
|---|---|---|
| 3,586,992 | 6/1971 | Garfein . |
| 4,475,209 | 10/1984 | Udren . |
| 4,484,028 | 11/1984 | Kelley et al. . |
| 4,495,494 | 1/1985 | McCune . |
| 4,665,521 | 5/1987 | Smith . |
| 4,839,917 | 6/1989 | Oliver . |
| 5,095,450 | 3/1992 | Shakra et al. . |
| 5,121,342 | 6/1992 | Szymborski et al. . |
| 5,167,024 | 11/1992 | Smith .................................. 395/750.04 |
| 5,182,810 | 1/1993 | Bartling et al. . |
| 5,260,612 | 11/1993 | Lehmann et al. . |
| 5,327,463 | 7/1994 | Matsumoto . |
| 5,396,636 | 3/1995 | Gallagher et al. . |
| 5,408,423 | 4/1995 | Kawagishi . |
| 5,446,404 | 8/1995 | Badyal et al. . |
| 5,481,194 | 1/1996 | Schantz et al. . |
| 5,594,893 | 1/1997 | Byers et al. . |
| 5,594,906 | 1/1997 | Holmes, II et al. . |
| 5,649,210 | 7/1997 | Allen .................................. 395/750.03 |
| 5,708,971 | 1/1998 | Dent ....................................... 455/38.3 |
| 5,799,194 | 8/1998 | Allen et al. ........................ 395/750.03 |

FOREIGN PATENT DOCUMENTS 573 204  12/1993  European Pat. Off. .

OTHER PUBLICATIONS

"Power Supply Control Via Monitoring of Communications Signals", IBM Technical Disclosure Bulletin, vol. 38, No. 4, Apr. 1995, p. 463.

*Primary Examiner*—Paul R. Myers
*Attorney, Agent, or Firm*—Blakely, Sokoloff, Taylor & Zafman LLP

[57] ABSTRACT

Methods and apparatus for providing network communications capability to a computer system in accordance with standard communication line protocols are described, including interface circuits which sense various characteristics of the communication lines to control or provide signals to control power to line drivers and/or other substantial power consuming circuitry to conserve power when communication line conditions indicate powering such circuits is not useful. Various embodiments are disclosed.

16 Claims, 6 Drawing Sheets

6,000,003

COMMUNICATION CIRCUIT HAVING NETWORK CONNECTION DETECTION CAPABILITY

The present application is a continuation-in-part of U.S. patent application Ser. No. 08/534,954 filed Sept. 28, 1995 U.S. Pat. No. 5,799,198, which is a continuation-in-part of U.S. patent application Ser. No. 08/315,130 filed Sept. 29, 1994 U.S. Pat. No. 5,649,210. Both applications are assigned to the assignee of the present invention.

BACKGROUND OF THE INVENTION

1. Field of the Invention

The present invention relates generally to the field of digital communications, and particular to communications interface circuits and power management systems and methods.

2. Related Art

Various communication interface standards are known for establishing communications between computer systems and peripheral devices. One example of such an interface is the RS-232 serial communications interface standard which is used in many applications, including IBM compatible personal computers. Other common standards include the RS-485 or RS-422 standards. Such digital communications standards include specifications adequate for equipment of different designs and manufacture to communicate with each other. Conventionally, the circuitry used to provide a computer system with RS-232 communications interface capability remains active and powered even when not connected to a device. In the past, when computer systems were generally powered via a standard electrical outlet, this constant utilization of power did not present a problem because of the virtually inexhaustible supply of power available.

However, with the recent popularity of portable laptop and palmtop computers, which generally draw power from a rechargeable battery, this unnecessary power consumption has become problematic. Without a check on the status of its connection to other systems, the unused interface circuitry continues to drain power from the rechargeable battery, thereby reducing the amount of time the portable computer system may be used remotely.

To reduce this unnecessary power consumption, and thereby extend the time the rechargeable battery remains charged, it is desirable to provide a communication interface circuit which detects when it is not coupled to another communications system, and which responds by signaling for the application of power to certain portions of the interface circuit to be suspended. It is also desirable for the interface circuit to include a power management system that monitors communication activity through the communication interface circuit. The power management system signals certain portions of the communication interface circuit to shut (or power) down if there exists no communication activity through the communication interface circuit for a prescribed period of time as well as power up in the event that communication activity is detected and the communication interface circuit is shut down.

SUMMARY OF THE INVENTION

Methods and apparatus for providing network communications capability to a computer system in accordance with standard communication line protocols are described, including interface circuits which sense various characteristics of the communication lines to control or provide signals to control power to line drivers and/or other substantial power consuming circuitry to conserve power when communication line conditions indicate powering such circuits is not useful. Embodiments for sensing valid/invalid line signals on the communication lines, for sensing proper/improper line loads on the transmit lines and for sensing the presence/absence of transmitter or receiver data are disclosed.

BRIEF DESCRIPTION OF THE DRAWINGS

The features and advantages of the present invention will become apparent from the following detailed description of the present invention in which.

DETAILED DESCRIPTION OF THE INVENTION

Figure 1:
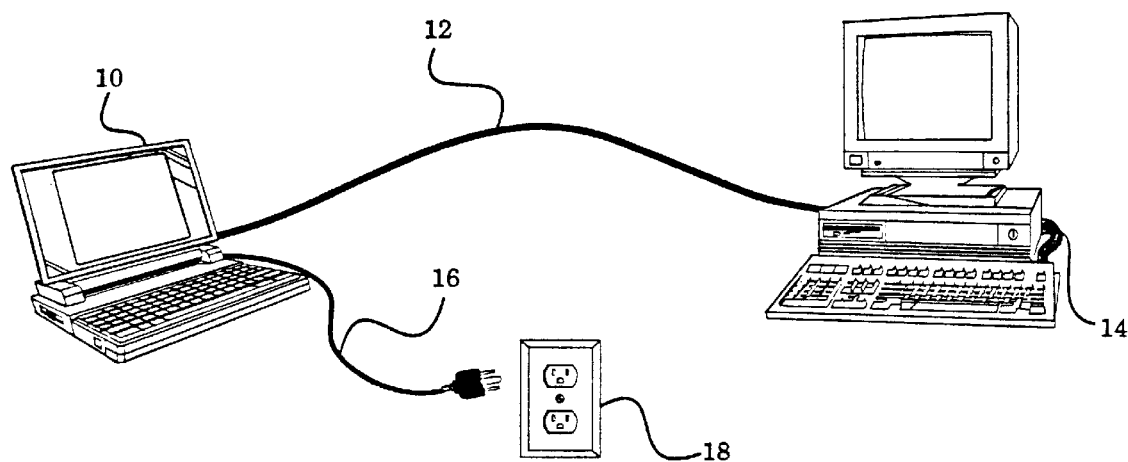
FIG. 1 is an illustration of a laptop computer communicating with a desktop personal computer in accordance with one embodiment of the invention.

First, referring to FIG. 1, an illustration of an exemplary computer system, such as a laptop computer 10 coupled to a desktop computer 14 by an RS-232 line 12 may be seen. FIG. 1 is intended to be exemplary only, as a computer system may be similarly coupled to a network or other device such as, by way of example, a modem or test equipment. Such laptop computers are designed for portability, with an internal rechargeable battery (not shown) that allows the laptop computer to be used as an isolated unit when external power is not available. When operated from the battery, a laptop may be operated without connection to external devices or networks of any kind, though can also be connected to a modem, a printer or other device such as on an RS-232 line. When inserted into outlet 18, power line 16 provides power to the laptop computer, allowing the laptop to operate in the normal manner and possibly to recharge the battery as required.

Figure 2:
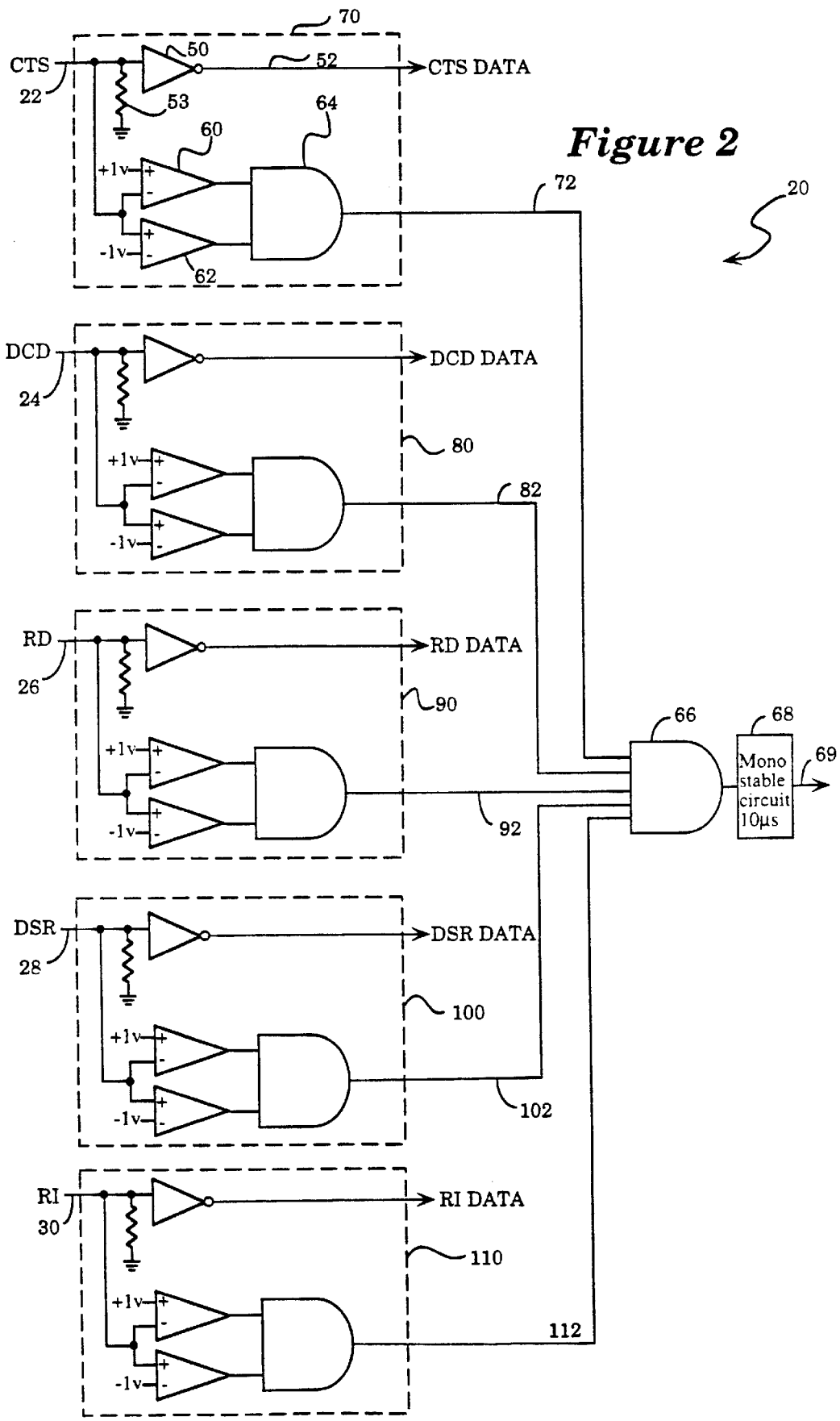
FIG. 2 is a circuit diagram illustrating an interface circuit configured in accordance with the described embodiment of the invention.

FIG. 2 is a circuit diagram illustrating an interface circuit 20 used in the laptop 10 of FIG. 1 when configured in accordance with one embodiment of the invention. The interface circuit 20 comprises a plurality of identical line interface circuits 70, 80, 90, 100 and 110, an AND gate 66 and a monostable circuit 68. Each line interface circuit monitors an RS-232 line controlled by data communications equipment (DCE) that may be connected to the computer by an RS-232 cable to determine the status of the respective line. In the present embodiment, line interface circuits 70, 80, 90, 100, 110 are used to couple the laptop to data communications equipment via Clear to Send (CTS) line 22, Carrier Detect (DCD) line 24, Receive Data (RD) line 26, Data Set Ready (DSR) line 28 and Ring Indicator (RI) line 30, respectively. CTS line 22, DCD line 24, RD line 26, DSR line 28 and RI line 30 are part of the RS-232 communications interface standard and are embodied as individual wires in interface cable 12. In response, each circuit 70, 80, 90, 100, 110 generates a Single line Invalid signal on signal lines 72, 82, 92, 102, 112 respectively, which indicate whether each line interface circuit 70, 80, 90, 100, 110 is connected to a network or another communications device such as a desktop computer as shown in FIG. 1 or a modem.

Each signal line 72, 82, 92, 102, 112 is provided as an input to AND gate 66. The AND gate 66 provides an output to monostable circuit 68 which in turn generates a Master Invalid signal on line 69 in the event all line interface circuits provide a line invalid signal to the AND gate, indicating that none of the RS-232 lines monitored have a valid signal thereon. The Master Invalid signal indicates that the entire interface circuit 20 is not connected to a network or another device, or alternatively, is connected to a network or other device that is not powered, and in either case, may be used by the laptop computer to regulate or shut off power to other circuitry in the laptop computer connected to the RS-232 lines, such as line drivers, receivers, and the like.

Referring again to FIG. 2, line interface circuit 70, which is representative of line interface circuits 80, 90, 100, 110, comprises an inverter 50, two voltage comparators 60, 62, a resistor 53 and an AND gate 64. Resistor 53 is coupled between the CTS input line 22 and ground, in a preferred embodiment a line load of 5 kΩ, and unless the CTS line is connected to another powered device driving the line to other voltages, will pull the line to ground voltage. Voltage comparator 60 has its inverting input coupled to CTS line 22 and its non-inverting input coupled to a positive one volt (+1V) voltage source. The non-inverting input of voltage comparator 62 is coupled to the CTS line 22 and the inverting input is coupled to a negative one volt (−1V) voltage source. The outputs of voltage comparator 60 and 62 are coupled to the inputs of AND gate 64, which generates a Single Line Invalid signal on line 72. When laptop computer 10 and desktop computer 14 are communicating with each other over RS-232 cable 12 (FIG. 1), the voltage on the CTS line 22 will generally vary between positive three (+3.0) volts or greater, and negative three (−3.0) volts or less. Each of the other line interface circuits 80, 90, 100 and 110 perform similarly in response to voltage levels present on their respective input signal lines, and the combination of all the line interface circuits form the data terminal equipment input portion of a standard RS-232 communication interface.

While inverter 50 of line interface circuit 70 is driving internal data line 52, voltage comparators 60 and 62 of line interface circuit 70 are also monitoring the voltage level on the CTS line 22. When the voltage level on the CTS line 22 is greater than −1.0 volt, the voltage level on the non-inverting input of voltage comparator 62 will be greater than the voltage level on its inverting input. This causes voltage comparator 62 to apply a logic high to AND gate 64. When the voltage level on the CTS line 22 is less than +1.0 volt, the voltage level on the inverting input of voltage comparator 60 will be less than the voltage level on its non-inverting input. This causes voltage comparator 60 to apply a logic high to AND gate 64. Thus, when the voltage level on the CTS line 22 is between −1.0 and +1.0 volts, which is a voltage range which is less than the range associated with a valid RS-232 logic level, voltage comparator 62 and voltage comparator 60 will both simultaneously assert logic highs, which in turn will cause AND gate 64 to assert a Single Line Invalid signal that is applied to AND gate 66. If none of the signals CTS, DCD, RD, DSR and RI are in the valid range, all inputs to AND gate 66 will be high, and thus the output thereof will go high.

As one possible exception, signals changing state must pass through the range of −1.0 volts to +1.0 volts, so may have transient values in the designated invalid signal range. This is taken care of by monostable circuit 68, which maintains the present valid (low) state of the output signal on line 69 until the new invalid (high) signal asserted by AND gate 66 remains logic high for at least 10 microseconds ("μs"), adequate to insure against a false triggering of the invalid signal by temporary conditions on the RS-232 lines. Such temporary conditions may be created when simultaneous transitions across all the RS-232 signal lines cause all the signals to temporarily be at invalid voltage levels. However, since these signals only remain at an invalid logic level for substantially less than 10 μs, monostable circuit 68 effectively prevents false Master Invalid signals from being asserted in response to these temporary conditions.

In an alternate embodiment, voltage comparator 60 may be configured to perform the function of inverter 50. Alternatively, voltage comparator 62 may be configured to perform the function of inverter 50. In a further embodiment, the outputs of comparators 60, 62 are provided directly to AND gate 66 as one of 10 signal inputs thereto.

In a further alternate embodiment, the voltage asserted on CTS data line 22 may be determined by sensing the current through resistor 53. Using the same −1.0 volt to +1.0 volt signal invalid range as before, such range would be the equivalent of a current through the resistor 53 of −200 μamps to +200 μamps. The Single Line Invalid signal indicating a current within this range would be applied to AND gate 66 via line 72.

Figure 3:
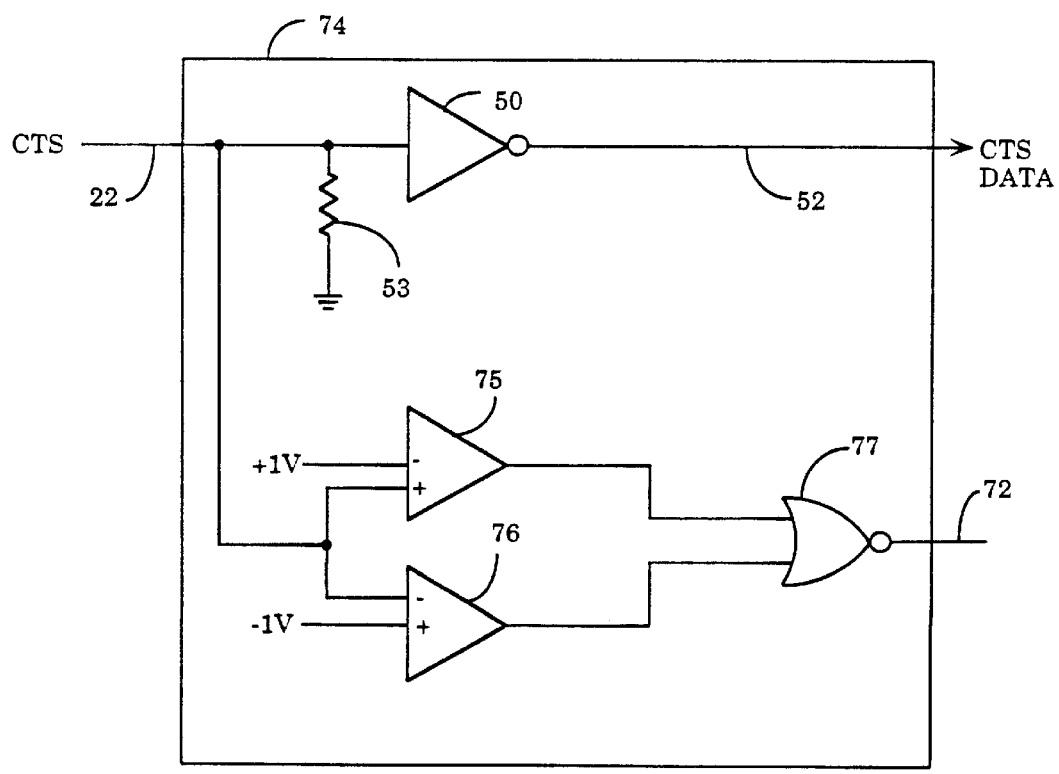
FIG. 3 is a circuit diagram illustrating an alternative embodiment of a line interface circuit in accordance with the invention.

FIG. 3 illustrates a still further alternate embodiment of line interface circuit 70. Herein, inverter 50 and resistor 53 operate as previously described. Voltage comparator 75 has its non-inverting input coupled to CTS line 22, and its inverting input coupled to a positive 1 Volt (+1.0 volt) voltage source. The inverting input of voltage comparator 76 is coupled to CTS line 22, while the noninverting input is coupled to a negative 1 volt (−1.0 volt) voltage source. Now the outputs of voltage comparators 75 and 76 are both low if the voltage of the CTS line is in the range of −1.0 volt to +1.0 volt, and as connected to NOR gate 77, generate the same single line Invalid signal on line 72 as before. Other line interface circuits 80, 90, 100, 110 may be similarly implemented.

Thus, the hereinbefore described interface circuit 20 will assert a logic high on line 69 that can be used by computer system 10 to suspend the application of power to certain portions of the interface circuit used to receive and transmit information in accordance with the RS-232 interface standard, such as, but not necessarily limited to, line drivers and receivers. By suspending the application of power to certain portions of the circuit, the total power consumed by computer system 10 of FIG. 1 is reduced, thus extending the duration the rechargeable battery may be used to power the laptop computer between battery charges. In that regard, while the monitoring circuits of the present invention are intended to be powered all the time, they can be easily realized by very low power circuits, yet their control of much higher power circuits results in very substantial power savings.

Thus, a method and apparatus for operating a computer system that allows for reduced power consumption is described. While the invention is described in the context of an RS-232 compatible circuit, the invention can also be utilized with other communication standards and interfaces that use voltage level transitions over signal lines to transmit data, such as, by way of example, RS-485 and RS-422 communication standards. Also, while the invention is shown used within a portable computer system, it can be included in any communications system that would benefit from reduced power consumption. The interface circuit can also internally turn on and off sections of its circuitry without intervention or control by the computer system 10. Furthermore, the computer system 10 can use the Invalid signal to indicate to the user, or to other software, whether or not the computer system 10 is connected to an active network, communications system, or other communications device.

The invention discussed above and depicted in FIGS. 2 and 3 provides a communication interface circuit which detects, at the receiver input, when it is not coupled to another active communications system. When not thus coupled, the communication interface circuit provides a signal so that the application of power to certain portions of its circuitry can be suspended. However, an alternative method of detecting the connection or lack of connection of the communication lines to another device in accordance with the present invention is to detect a load on one or more of the transmitter outputs of the computer system 10 (the data terminal equipment outputs) to provide a status signal which indicates when a transmitter in a computer system is coupled to another device so that the application of power to certain portions of the interface circuit such as driver circuits can be suspended when the transmitter is not coupled to another device. It is also desirable to provide a power management system which turns on powered-off circuits in a computer system when signal transmission activity is detected.

Figure 4:
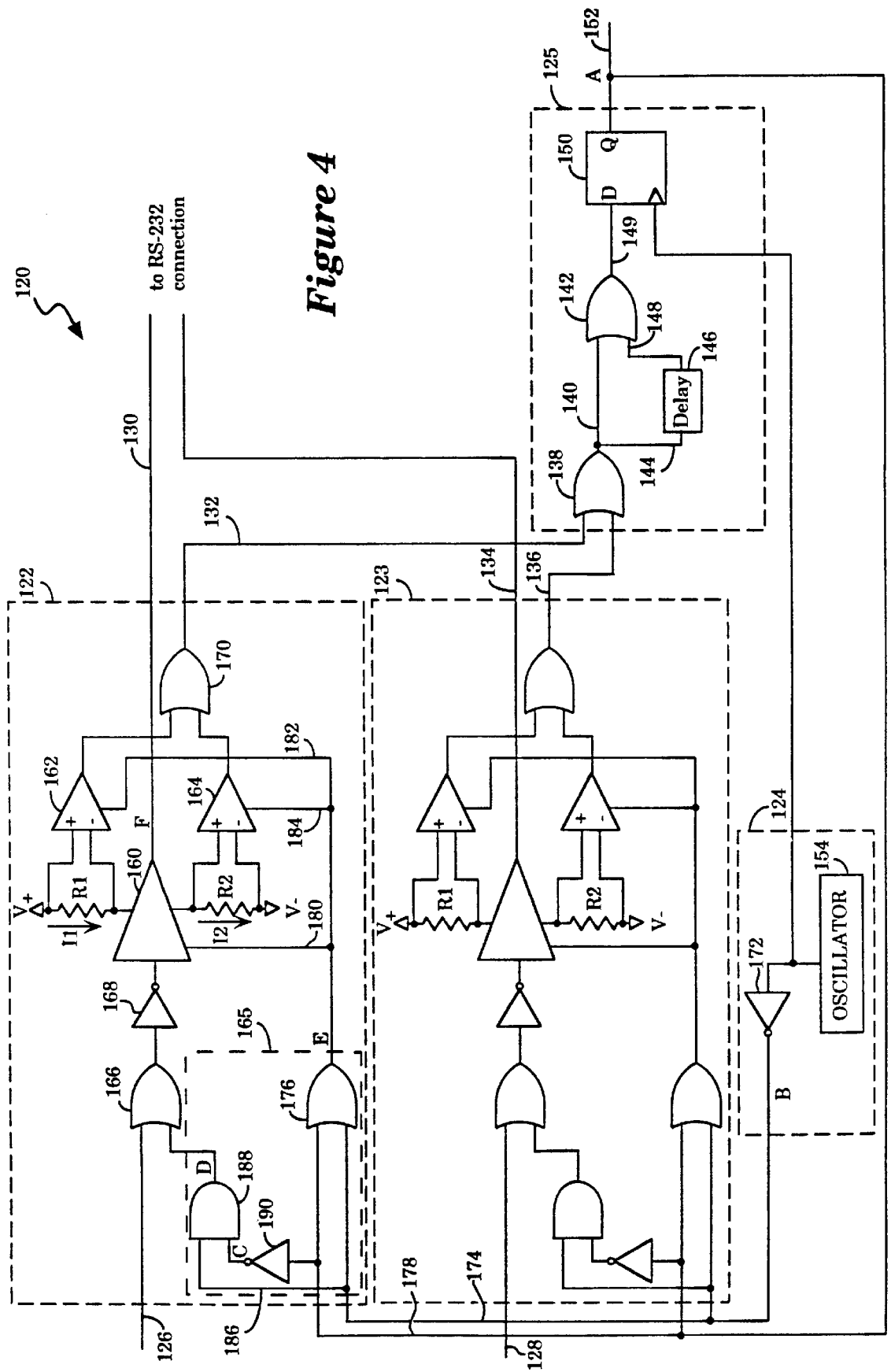
FIG. 4 is a circuit diagram illustrating a preferred embodiment of a communication interface circuit in accordance with a second aspect of the present invention.

Such an embodiment is shown in FIG. 4. In this specific embodiment, RS-232 interface circuit 120 within a computer consists of one or more signal line interface circuits, such as interface circuits 122 and 123, an oscillator circuit 124 and an output circuit 125. Assuming two RS-232 transmitters, the transmitter signals are provided by the computer via signal lines 126 and 128. Each signal line interface circuit 122 and 123 generates two outputs, which are provided on lines 130, 132 and 134, 136 respectively. The signals provided on lines 130 and 134 represent the output of the transmitter devices, and are provided to an RS-232 port (not shown). Lines 132 and 136 are provided as inputs to output circuit 125.

The interface circuit 120 is designed to operate regardless of whether other on-board power supplies are on or off as will be discussed in detail in the following sections. In a preferred embodiment, other on-board power supplies may be controlled by the signal provided on line 152, as generated by the circuit 120.

Signal line interface circuit 122, which is representative of signal line interface circuit 123, comprises an Output Driver 160, two current sense amplifiers 162 and 164, OR gates 166 and 170, an inverter 168 and a feedback circuit 165. The signal line interface circuit 122 receives data for transmission via signal line 126 from the laptop computer system 10 of FIG. 1. The signal on line 126 is provided as one input to OR gate 166, which in turn provides its output to an inverter 168. Assuming the second input to OR gate 168, node D, is low at this time, the output of the OR gate will follow its first input. The inverter 168 inverts the output of OR gate 166 and provides the inverted signal to Output Driver 160. In a preferred embodiment, the Output Driver 160 may be implemented using the circuit described in U.S. patent application Ser. No. 08/257,194, entitled "HIGH SWING INTERFACE STAGE", filed on Jun. 9, 1994, and assigned to the assignee of the present application. The disclosure in U.S. patent application Ser. No. 08/257,194 is incorporated herein by reference.

Again assuming the second input (node D) to OR gate 166 is low, if a load exists on the output of the transmitter circuit, i.e., if the transmitter circuit is coupled to a receiver circuit in desktop computer system 14 of FIG. 1, or to another device, a current I1 will flow from terminal $V_+$ through resistor R1 to the load via line 130 if the output (the TD signal of the RS-232 standard) of the transmitter circuit is a positive voltage. The current I1 flowing through R1 causes a voltage V1 to develop across R1. This results in a positive potential difference across the non-inverting and inverting inputs of the current sense amplifier 162, which generates a logical high or a logical "1" output in response.

Conversely, if a load exists on the output of the transmitter circuit and the output of the transmitter circuit is a negative voltage, a current I2 will be drawn from the load (i.e., the device coupled to the transmitter circuit) to terminal $V_-$. The current I2 flowing through R2 causes a voltage V2 to develop across R2. This results in a positive potential difference across the non-inverting and inverting outputs of the current sense amplifier 164, which generates a logical high or a logical "1" output of current sense amplifier 164 in response.

As shown in FIG. 4, the output of each current sense amplifier 162 and 164 is provided to OR gate 170. Thus, if the output of either current sense amplifier 162 or 164 is high, the output of OR gate 170 will also be high, indicating that a load exists on the transmitter circuit.

The outputs provided on lines 132 and 136 of signal line interface circuits 122 and 123, respectively, are provided to OR gate 138, which generates an output on line 140 in response. This output of OR gate 138 is provided to OR gate 142, and is also provided to a delay circuit 146 which generates a signal via line 148 to OR gate 142. The delay circuit 146 provides a delay (e.g., a 10 $\mu$s delay) in providing the output of OR gate 138 to OR gate 142. As a result, OR gate 142 provides a pulse via line 149 that is delayed by 10 $\mu$s from the onset of a pulse on line 140. This 10-$\mu$s delay prevents false signal indications during transmitter output signal transitions. Thus, the 10-$\mu$s delay is implemented to ensure that signals received from OR gate 138 are maintained for at least 10 $\mu$s. The signal provided on line 149 is clocked into latch circuit 150 by the output of oscillator 154. In a preferred embodiment, the oscillator 154 enables the latch circuit 150 approximately every 100 milliseconds ("ms"). Accordingly, the latch circuit 150 also provides an updated output approximately every 100 ms.

The signal A provided on line 152 may be used to indicate the existence of a load. Alternatively, it may be used to control other portions of the transmitter circuit to shut off unused portions of the transmitter circuit.

The oscillator 154 and signal A are used to pulse the interface circuit 122 on periodically, particularly the output drivers 160, via feedback circuit 165 and line 180. This is done to test for loads on the transmitter circuits when any or all portions of the transmitter circuit are otherwise not powered on. As shown in FIG. 4, the feedback circuit 165 comprises OR gate 176, inverter 190 and AND gate 188.

Assume, for instance, that the output driver 160 is inactive and the output of OR gate 170 is accordingly a logical low. This state is reflected in the outputs of gates 138, 142 and latch circuit 150, which are all at a logical low, as is node E reducing or shutting off power to the output driver 160 and current sense amplifiers 162 and 164. The oscillator 154, however, generates a pulse every 100 ms. This pulse, which has a period of 99 ms, is inverted by inverter 172. Thus, a pulse B having a period of 1 ms is generated every 100 ms to enable or power up the signal line interface circuit 122. The pulse B is provided on line 174 as one input to OR gate 176, while the output of latch circuit 150 is provided as a second input to OR gate 176 on line 178. The output E of OR gate 176, driven high by pulse B, is provided on lines 180, 182 and 184 to output driver 160 and current sense amplifiers 162 and 164, enabling (powering) output driver 160 and current sense amplifiers 162 and 164. As signals A and B are provided to OR gate 176, signal B is likewise provided on line 186 as an input to AND gate 188. The signal A provided on line 178, which is still low, is inverted by inverter 190 and then as a second input C to AND gate 188. In response, the AND gate 188 provides a high signal D as one input to OR gate 166, driving the output thereof high. This output is inverted by inverter 168 before being provided to output driver 160 to provide a low output on line 130.

In this manner, the circuits may be powered and an input signal may be provided to output driver 160 every 100 ms to determine if a load is coupled to the transmitter circuits when the transmitter circuits are otherwise in a powered-off or powered-down state. If a load exists on the transmitter output, current will flow from the load through R2, resulting in a logical high signal on the output of current sense amplifier 164. This signal will result in a logical high at the output of OR gates 170, 138, 142 and latch circuit 150. With the latch circuit output on node A high, OR gate 176 will hold node E high, holding output driver and current sense amplifiers on even after the 1 millisecond pulse on node B ends. This condition will persist until none of the current sense amplifiers sense a load for at least 10 microseconds, after which the latch 150 output will go low. This allows node E to respond to the oscillator signal on node B, resuming the periodic testing of the communication lines for a load indicative that a load has appeared by someone hooking up the RS-232 cable. The net effect is that the 1% duty cycle of the line testing (1 millisecond every 100 milliseconds) conserves on the order of 99% of the energy that would have been otherwise uselessly dissipated. Also while the circuit of FIG. 4 contemplates testing of the communication line by driving the input to the output driver 160 to a particular state and detecting the driver current requirements, the input to the output driver may be driven to the either state for this test, as the circuit of this embodiment is symmetrical in its current detection capabilities.

Figure 5:
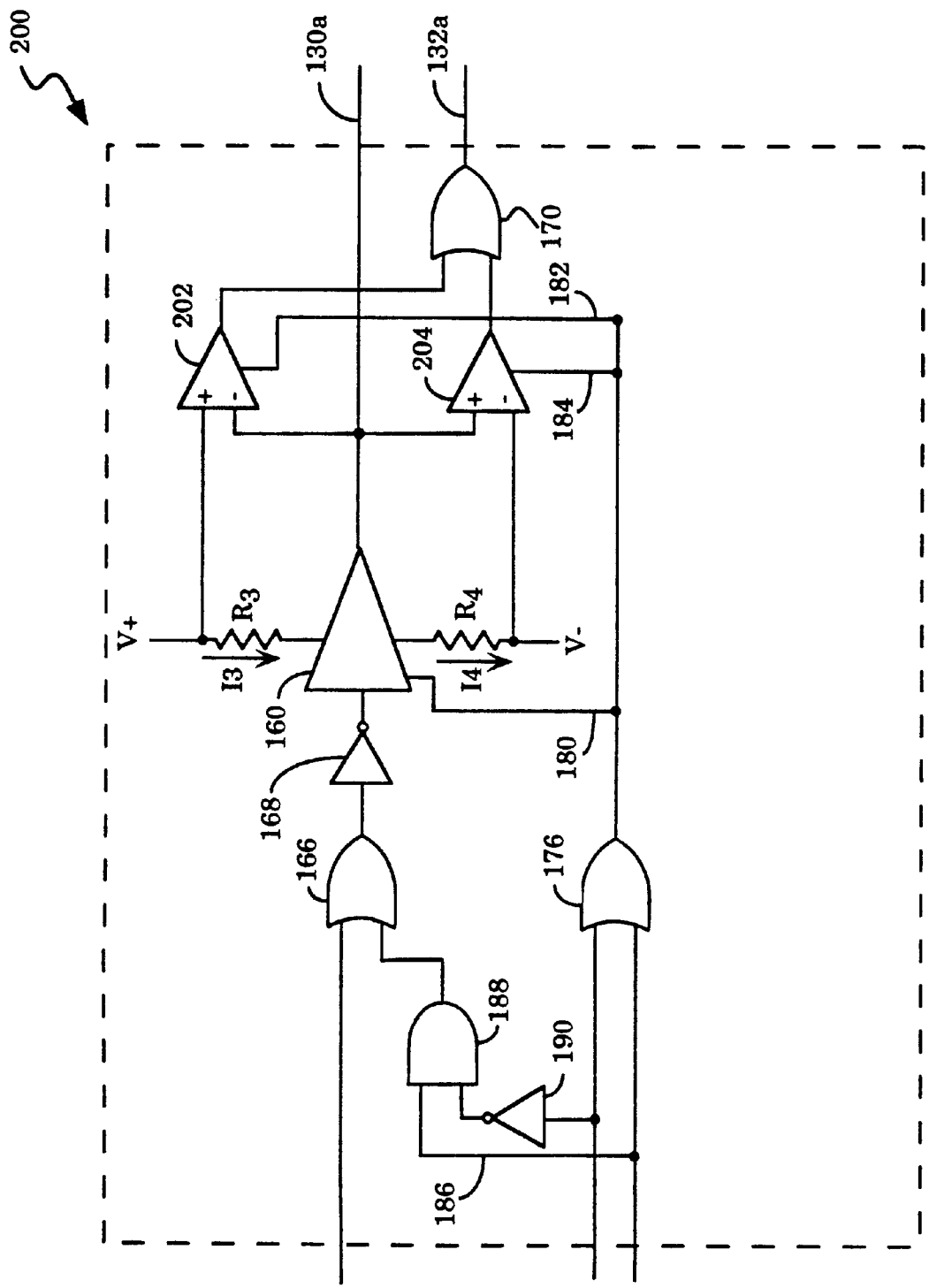
FIG. 5 is a circuit diagram illustrating an alternative embodiment of the communication interface circuit of FIG. 4.

FIG. 5 is an alternate embodiment of the communication interface circuit 120 shown in FIG. 4. The communication interface circuit 200 is similar to communication interface circuit 120, with the exception that it utilizes two voltage comparators 202 and 204 instead of current sense amplifiers 162 and 164. The non-inverting terminal of voltage comparator 202 is connected to terminal V+ and the inverting terminal of voltage comparator 202 is connected to the output of Output Driver 160. If a load exists on the transmitter output and the transmitter output is a high voltage, current I3 will flow from the terminal V+ to the load via line 130, establishing a voltage V3 across resistor R3. The positive potential difference between the non-inverting and inverting terminals of 202 result in a logical high output from voltage comparator 202, indicating the existence of a load at the transmitter output.

If a load exists on the transmitter output and the transmitter output is a low voltage, current I4 flows from the load to terminal V−, establishing a voltage V4 across resistor R4. This results in a positive potential difference between the non-inverting and inverting terminals of voltage comparator 204. Consequently, the voltage comparator 204 provides a logical high output, indicative of the existence of a load at the transmitter output. Thus, the outputs of the comparators 202 and 204 duplicate the outputs of the current sense amplifiers of FIG. 4, and after combining in OR gate 170, can be used to control the output circuit 125 of FIG. 4.

Figure 6:
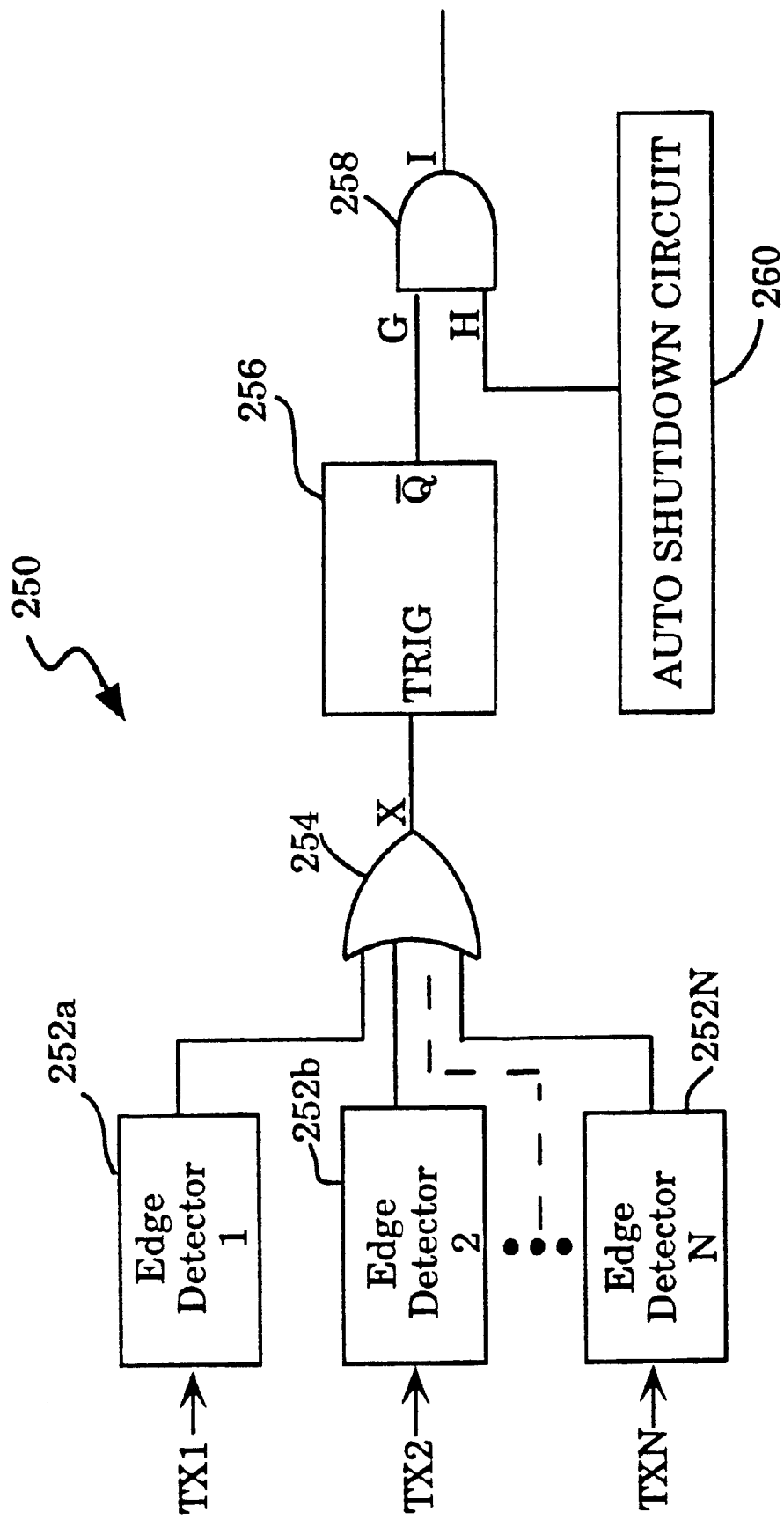
FIG. 6 is a circuit diagram illustrating a preferred embodiment of a power management system in accordance with a third aspect of the present invention.

The invention discussed above and depicted in FIGS. 2, 3, 4 and 5 may also be used independently, or in conjunction with a power management system to power up circuits from a powered off state. FIG. 6 is a circuit diagram illustrating a preferred embodiment of a power management system 250 in accordance with a third aspect of the present invention.

The power management system 250 comprises a plurality of edge detectors 252a, b, . . . N. The edge detectors 252a, b, . . . N receive inputs TX1, TX2, . . . TXN from transmitter input signals (transmit data or TD in RS-232 parlance) coupled to the interface. As is apparent to one skilled in the art, there may be fewer or a greater number of inputs TX1, TX2, . . . TXN, than those depicted in FIG. 6. The output of each edge detector 252a, b, . . . N is provided to an OR gate 254. The output X of the OR gate 254 is provided to a retriggerable monostable circuit 256 which is automatically reset (Q low, $\overline{Q}$ high) preferably 10 seconds after its last set. Thus, if no signal transition by the output of OR gate 254 is detected for 10 seconds, the retriggerable monostable circuit 256 will be set, and the output $\overline{Q}$ of retriggerable monostable circuit 256 will become a logical "1". If signal transitions are detected, the retriggerable monostable circuit 256 is maintained in the set condition and the $\overline{Q}$ output of retriggerable monostable circuit 256 is consequently a logical "0".

In ordinary communications, the retriggerable monostable circuit will be set more frequently than every 10 seconds, so that the $\overline{Q}$ output will remain low so long as the transmitter is transmitting. The output $\overline{Q}$ of retriggerable monostable circuit 256 is provided as one input G to AND gate 258. A signal from Auto Shutdown circuit 260 is provided as a second input H to AND gate 258. In an exemplary embodiment, the Auto Shutdown circuit 260 may be implemented using the output of the interface circuit 120 of FIG. 2, which output is high if all signals thereto are invalid. The output I of AND gate 258 may be used to power up or shut down transmitter driver circuitry, the output being high only when all the transmitter inputs are inactive and when the circuit of FIG. 2 indicates that active Data communications equipment is not coupled to an RS-232 port. It may also be used to generate an interrupt or another signal which indicates that a communications link such as an RS-232, RS-485 or RS-422 link with another system is either established or disconnected. The power management system 250 may also be used to indicate that a system such as a transmitter or receiver or a communication link is turned on or off.

Figure 7:
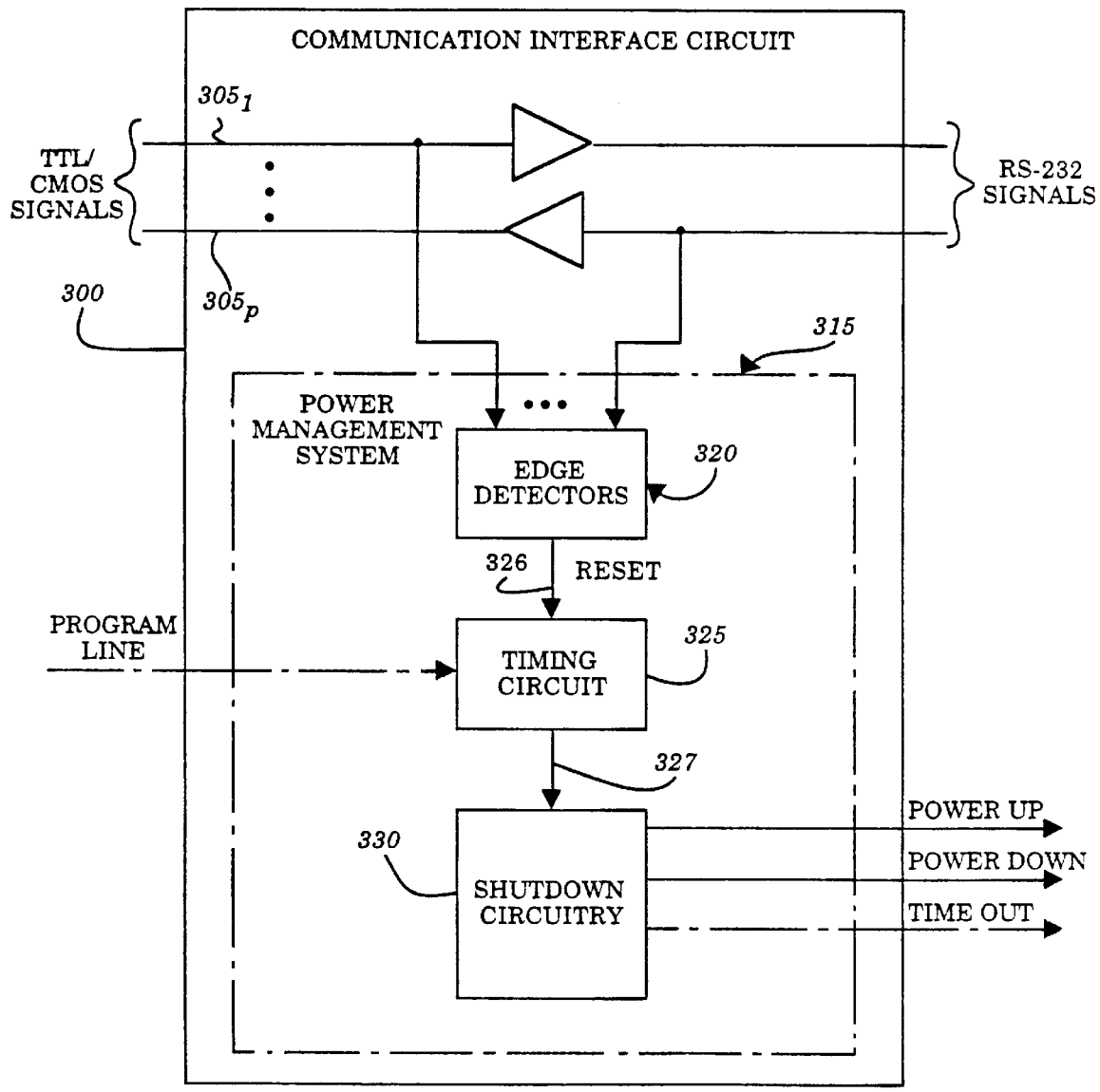
FIG. 7 is a circuit diagram illustrating another embodiment of the power management system operating in accordance with a fourth aspect of the present invention.

Referring now to FIG. 7, another embodiment of the power management system is shown in which certain circuitry (e.g., line drivers) of the communication interface circuit is powered down if no communication activity occurs for a prescribed period of time on standard communication lines (e.g., RS-232, RS-485, or RS-422 signal lines). Communication activity is determined by the presence of signal transitions on one of the standard communication lines (e.g., a Receive (RX) RS-232 signal line, or a Transmit (TX) RS-232 signal line). Typically, the signal transitions are detected upon the rising or falling edge of the signal.

As shown, the communication interface circuit 300 receives and transmits data through standard communication lines $305_1$–$305_p$ (where "p" is a positive whole number). These data lines are preferably configured to propagate data in accordance with a RS-232 voltage levels as well as TTL or CMOS voltage levels. Preferably, each of the standard communication lines $305_1$–$305_p$ is monitored by the power management system 315 to power down certain portions of the communication interface circuit (hereinafter referred to as "selected circuitry") if no communication activity is detected for a prescribed period of time. The prescribed period of time may range from a fraction of a second to minutes or longer, if desired.

More specifically, the power management system 315 includes a plurality of edge detectors 320, a timing circuit 325 and shutdown circuitry 330. Each of the edge detectors 320 is uniquely coupled to one of the standard communication lines $305_1$–$305_p$ to detect communication activity by detecting signal transitions on any of these lines and to provide a pulse in response thereto. The outputs of the edge detectors are effectively ORed together to provide the Reset signal responsive to the outputs of any one or more of the edge detectors.

Upon detecting communication activity, the timing circuit 325 is reset by the edge detectors 320 through activation of a "Reset" control signal line 326. Activation of the "Reset" control signal line 326 by the edge detectors may cause one of two functions, depending on whether a time-out condition has occurred. A "time-out" condition occurs if the timing circuit 325 fails to be reset within a prescribed period of time. The prescribed time period may be static or programmable by the user through well-known techniques such as pin strapping, selection of a resistance or capacitance and the like.

If the timing circuit 325 receives an active Reset signal via signal line 326 before the prescribed period of time has elapsed, the timing circuit 325 is reset. In response, the timing circuit 325 precludes the shutdown circuitry 330 from powering down the selected circuitry. Alternatively, if the timing circuit 325 receives an active Reset signal during a time-out condition, indicating resumption of communication activity on at least one of the plurality of standard communication lines $305_1$–$305_p$, the timing circuit 325 is reset and signals the shutdown circuitry 330 via signal line 327 to power up the selected circuitry.

Although not shown, the timing circuit 325 may be configured as an increment or decrement counter indexing its count every cycle until a terminal count value is reached. The product of the terminal count value and the time period of one cycle is equivalent to the prescribed time period.

The shutdown circuitry 330 may receive a control signal from other circuitry within the communication interface circuit 300 (e.g., power management system of FIG. 4) to request the selected circuitry to be shut down or powered up. Likewise, as shown above, the shutdown circuitry 330 may be configured to automatically power down or power up the selected circuitry within the communications interface circuit upon receiving a control signal from the timing circuit 325 indicating that the time-out condition has occurred or communication activity detected during a time-out condition, respectively.

The embodiments set forth above are intended merely to demonstrate one implementation of the invention and should not be viewed as limiting its scope. Other implementations and embodiments of the invention will be readily apparent to those skilled in the art.

What is claimed is:

1. An interface circuit comprising:
   a first circuit for detecting a predetermined characteristic associated with both a first communication line and a second communication line;
   a second circuit coupled to the first circuit, the second circuit for providing a control signal upon detecting the predetermined characteristic of the first communication line and for providing the control signal upon detecting the predetermined characteristic on the second communication line;
   power control circuitry for deactivating selected circuitry of the interface circuit when a prescribed period of time has elapsed before the predetermined characteristic is detected on one of the first and second communication lines; and
   timing means for reactivating the selected circuitry, each successive reactivation to again monitor signal activity on the first and second communication lines.

2. The interface circuit of claim 1 wherein the predetermined characteristic is evident when a load is placed on the second communication line, the second communication line includes a transmit line.

3. The interface circuit of claim 1 further comprising a third circuit for detecting a change in level of a transmitter signal, the second circuit also responding to the transmitter signal to provide the control signal upon detecting a change in level of the transmitter signal.

4. The interface circuit of claim 1, wherein the selected circuitry includes circuitry for receiving a signal.

5. The interface circuit of claim 1 wherein the predetermined characteristic includes signal transitions.

6. The interface circuit of claim 5 wherein the predetermined characteristic includes a signal which does not dwell in a limited voltage range around ground voltage.

7. The interface circuit of claim 5 wherein the predetermined characteristic includes a signal which frequently transitions between signal states.

8. The interface circuit of either of claims 5, 6 or 7 wherein the first communication line includes a receive communication line.

9. An interface circuit for connection to serial communication lines intended to be controlled by a communications device coupled to the opposite end of the communication lines comprising:
   a first circuit for detecting the presence or absence of a valid signal level on each of the communication lines and for providing a control signal indicative of a lack of detection of the valid signal level on any of the communication lines;
   a power control circuit for deactivating circuitry associated with the interface circuit in response to the lack of detection of the valid signal level on any of the communication lines after a prescribed period of time has elapsed; and
   a timing circuit coupled to the first circuit and the power control circuit, the timing circuit for reactivating the circuitry associated with the interface circuit to monitor signal activity on any of the communication lines.

10. The interface circuit of either claim 9 wherein the valid signal level is detected by the detection of a signal which does not dwell in a limited voltage range around ground voltage.

11. The interface circuit of claim 9, wherein the circuitry receives a signal over the serial communication lines.

12. An interface circuit for connection to standard communication lines comprising:

a first circuit including a receive line driver coupled to a first communication line and a transmit line driver coupled to a second communication line, the first circuit for detecting the presence or absence of a load on either (i) the receive line driver when the receiver line driver is on or (ii) the transmit line driver when the transmit line driver is on;

a second circuit for providing a control signal indicative of the presence or absence of the load on either the receive line driver or the transmit line driver;

a third circuit for (i) turning off the receive line driver upon detection of the absence of the load on the receive line driver for a prescribed period of time, and (ii) turning off the transmit line driver upon detection of the absence of the load for the prescribed period of time; and a fourth circuit for periodically turning on the receive and transmit line drivers when otherwise off, whereby the second circuit may periodically update the control signal.

13. A method of monitoring a communication line connection for connecting to a standard communication line comprising:

monitoring a plurality of communication lines to detect the presence or absence of a predetermined characteristic associated with any of the communication lines;

providing a control signal indicative of the detection of the predetermined characteristic of any of the plurality of communication lines;

deactivating associated circuitry to reduce the power consumption in response to the lack of detection of the predetermined characteristic on any of the plurality of communication lines over a prescribed period of time; and periodically reactivating the associated circuitry to attempt to detect the predetermined characteristic associated with any of the communication lines after the associated circuitry is deactivated.

14. The method of claim 13 wherein one of the plurality of communication lines includes a transmit line and the predetermined characteristic comprises an impedance indicative of a load on the transmit line.

15. The method of claim 13 wherein the predetermined characteristic includes a signal which does not dwell in a limited voltage range around ground voltage.

16. The method of claim 13 wherein the predetermined characteristic includes a signal which frequently transitions between signal states.

* * * * *